United States Patent [19]

Ueda

[11] 4,182,123
[45] Jan. 8, 1980

[54] HYDRAULIC POWER PLANT

[75] Inventor: Tsuneo Ueda, Kawasaki, Japan

[73] Assignee: Fuji Electric Co., Ltd., Kanagawa, Japan

[21] Appl. No.: 870,931

[22] Filed: Jan. 18, 1978

[51] Int. Cl.² ............................................. F16D 33/00
[52] U.S. Cl. ........................................ 60/325; 60/398; 405/78; 137/123; 290/54
[58] Field of Search .................. 60/325, 398; 61/19, 61/2; 137/123, 128, 142; 290/43, 54; 417/148, 150; 405/75, 78

[56] References Cited

U.S. PATENT DOCUMENTS

| 563,878 | 7/1896 | Paul | 417/148 |
|---|---|---|---|
| 1,273,704 | 7/1918 | White | 60/325 |
| 1,743,653 | 1/1930 | Boving | 417/150 |
| 2,783,392 | 2/1957 | Corbiere | 61/19 X |

FOREIGN PATENT DOCUMENTS

| 807206 | 6/1951 | Fed. Rep. of Germany | 137/123 |
|---|---|---|---|
| 249304 | 7/1969 | U.S.S.R. | 60/325 |

Primary Examiner—Edgar W. Geoghegan
Attorney, Agent, or Firm—Wenderoth, Lind & Ponack

[57] ABSTRACT

A hydraulic power plant has a reservoir with a dam wall, a water turbine connected to a generator, a penstock extending from the reservoir to the water turbine and passing over the dam wall without passing through the dam wall to supply water from the reservoir to the turbine, and a vacuum pump adapted to fill at least a portion of the penstock with water by a siphon effect and being connected at a substantially uppermost portion of the penstock which is located on the top of the dam wall.

4 Claims, 3 Drawing Figures

HYDRAULIC POWER PLANT

BACKGROUND OF THE INVENTION

The present invention relates, in general, to a hydraulic power plant, and more particularly to a dam-type hydraulic power plant making the best use of an existing dam.

DESCRIPTION OF THE PRIOR ART

Generally, dam-type hydraulic power generation is attained by damming rivers, streams or the like to confine and store the flow of water, then discharging water downstream therefrom, thereby driving a water turbine, so that the potential energy of the head water is converted into electric energy.

It is extremely advantageous to obtain electrical energy by such hydroelectric generation because of the shortage of energy these days. Notwithstanding, the number of hydraulic power plants has notably failed to increase as expected due to the fact that various problems, primarily environmental, social, economic, human, and ownership of land have been raised one after another as new dams have been successively established. Thus, it has been necessary to make use of existing dams, for low head hydraulic power generation, which are used for irrigation, inland navigation, flood control and the like. However, conventional hydraulic power plants are not for such dams.

For example, one known hydraulic power plants is provided with a penstock extending from a reservoir through a dam wall to a water turbine (for example, a tubular turbine, Kaplan turbine, Francis turbine or the like) and is provided with an intake gate and a switching device (a hoist). This known design of a hydraulic power plant requires, however, a penstock extending through the dam wall, and accordingly, is not practical for use with an existing dam. This is because, when making use of an existing dam, the dam must be partially broken to have a penstock embedded in its wall, or otherwise the dam must be designed so that the penstock may be in the form of a bypass built at the side of the dam if the dam is to be left as it is. In any case, the dam is required to release the dammed-up water. This not only increases the cost of construction but also necessitates discontinuing the water supply for irrigation for a time. Another disadvantage of such a known hydraulic power plant is that the installation itself is complicated and thereby expensive, since a plant of this class includes intake gate means and switching means for rapidly shutting off the water flow, which means are large-scale and expensive as well as slow in operation.

In some known hydraulic power plants a siphon may be used to transfer water from the reservoir to the water turbine, but in this case a large-scale siphon chamber must be provided adjacent the dam. This also requires large-scale concrete construction work thereby entailing much labor and cost.

SUMMARY OF THE INVENTION

It is, therefore, a primary object of the present invention to provide a new and useful hydraulic power plant which is not only capable of making use of existing dams but also can be readily installed at a low cost and which thereby eliminates the aforementioned drawbacks.

This object is attained by providing a hydraulic power plant with a penstock extending from a reservoir over a dam wall to a water turbine without passing through the dam wall, wherein the penstock is provided with a vacuum pump to reduce the pressure in the penstock so that water flow from the reservoir to the water turbine by a siphon effect can be started.

The above object is further favorably attained by providing a penstock which is further provided with a vacuum breaker adapted to break the vacuum in the penstock so as to shut off the water flow into the turbine in a short time.

In accordance with the teaching of the present invention, a bypass passage extending from the reservoir to the penstock can be provided for quickly filling the penstock with water.

According to the present invention, a hydraulic power plant comprises a water turbine for driving a generator, and a penstock for introducing water from a reservoir to the water turbine and is characterized in that the penstock passes from the reservoir over a dam wall to the turbine without passing through the dam wall, and that a vacuum pump and a vacuum breaker are installed at a substantially uppermost portion of the penstock which is located on the top of the dam wall.

Preferably, the hydraulic power plant of the present invention includes a tubular turbine which is used where a relatively low head (normally 3-20 m) is employed.

It should be noted that the present invention may be applied to a higher head hydraulic power generation system and is capable of using any water turbine other than a tubular turbine, such as a Kaplan turbine, Francis turbine or the like.

The above and other objects and attendant advantages of the present invention will be more readily apparent to those skilled in the art from the following specification and accompanying drawings which describe and show preferred embodiments of the invention for illustration purposes only, but not for limiting the scope of the invention in any way.

DETAILED DESCRIPTION OF PREFERRED EMBODIMENTS

In order to facilitate understanding of the present invention, the above known hydraulic power plant will at first be briefly described referring to FIG. 1, and then the present invention will be described with reference to FIGS. 2 and 3.

Figure 1:
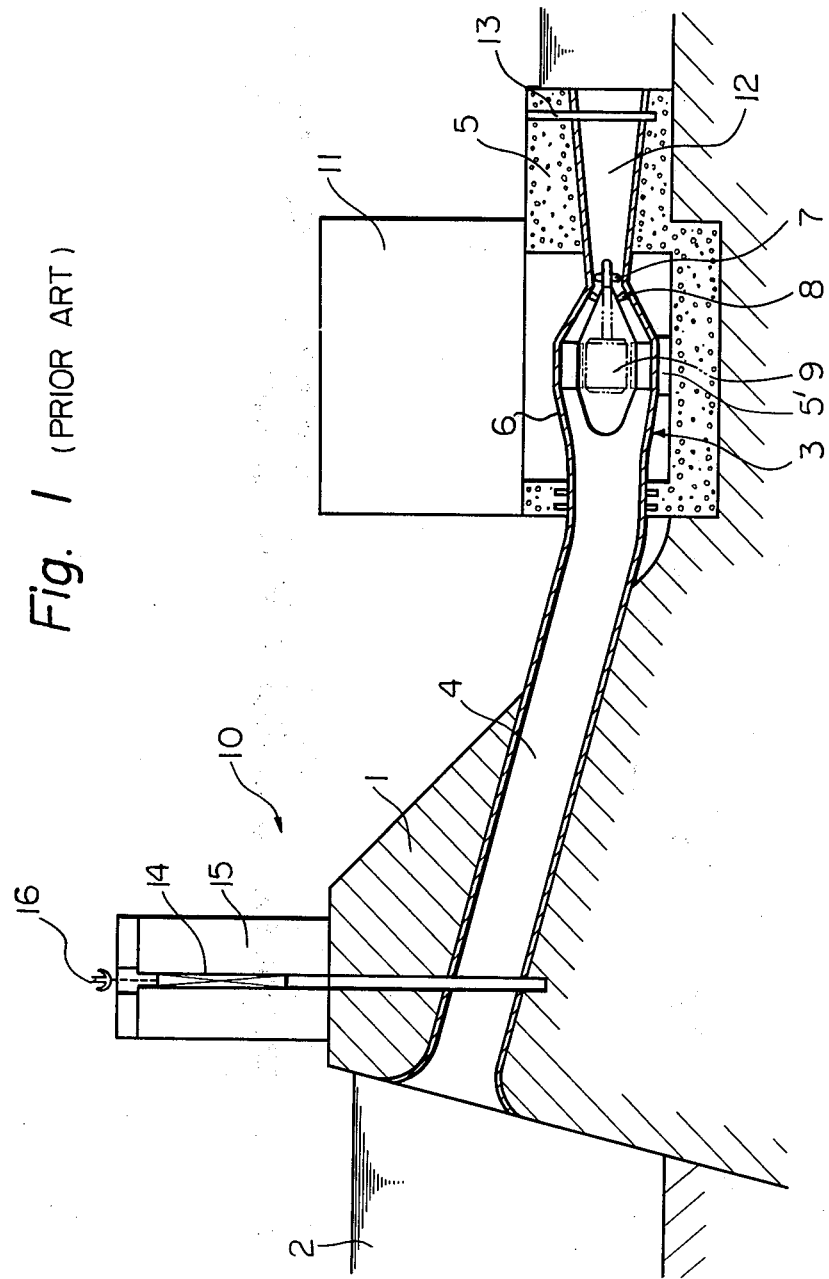
FIG. 1 is a longitudinal sectional view of a low head hydraulic power plant according to the prior art showing it in its inoperative condition.
Figure 2:
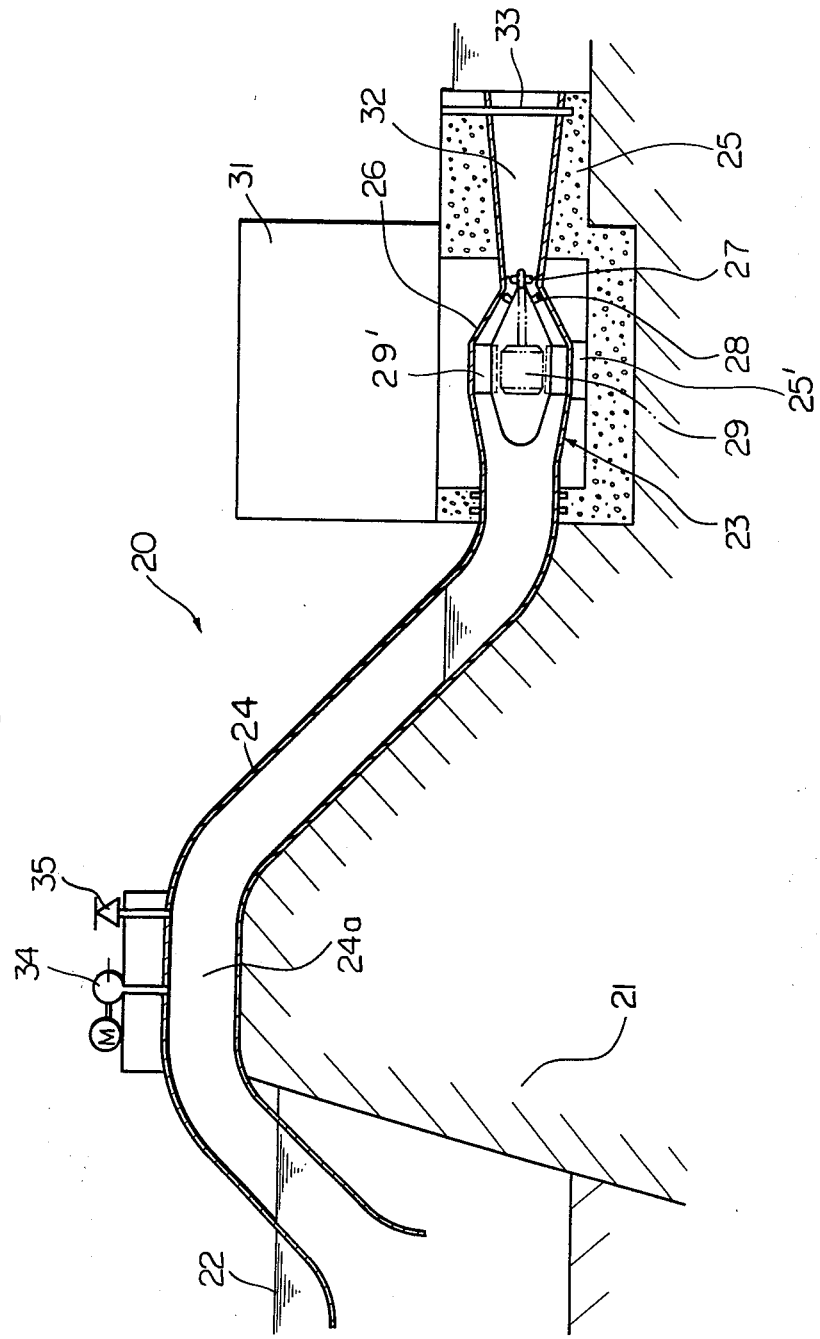
FIG. 2 is a longitudinal sectional view of a hydraulic power plant according to an embodiment of the present invention showing it in its inoperative condition.

Referring to FIG. 1, a hydraulic power plant 10 of the prior art comprises a dam 1 defining a reservoir 2, a tubular turbine 3, and a penstock 4 passing through the dam wall 1 and extending from the reservoir 2 to the tubular turbine 3. The tubular turbine 3 is supported on a base 5 such as a concrete block through the medium of a supporting member 5' and comprises a turbine casing 6, blades 7, guide vanes 8 and a generator 9. Power obtained by the generator 9 is sent to a suitable apparatus 11 in the power plant through suitable lines (not shown in the drawing). A discharge gate 13 is provided in a discharge 12 positioned downstream of the turbine 3 to open or close the discharge. Further, in the known hydraulic power plant 10, a heat gate or intake gate 14 is provided for rapidly shutting off water flow from the head tank to the turbine. This head gate 14 is moved along a guide 15 positioned on the top of the dam 1 by means of a hoist 16. However, this known hydraulic power plant 10 has a disadvantage in that it can not be easily installed in an existing dam, since as shown in FIG. 1, the penstock 4 must pass through the dam wall 1 and extend downwardly from the reservoir 2 to the turbine 3 to allow water in the reservoir to fall by gravity into the turbine. For example, if this power plant 10 is installed by in an existing dam, the water must be emptied out of the reservoir, then a portion of the dam wall must be broken or bored to embed the penstock, and then the dam wall must be reconstructed. This adds considerably to the time and money required for the construction of the dam. Further, the head gate and the hoist used in this power plant are large-scale and expensive, as well as slow in operation.

The present invention will now be explained in detail referring to FIGS. 2 and 3. A hydraulic power plant 20 (FIG. 2) according to the present invention comprises a dam 21 defining a reservoir 22, a water turbine 23 such as a tubular turbine, and a penstock 24 extending from the reservoir 22 to the water turbine 23, the turbine being supported on a base 25 such as a concrete block through the medium of a supporting member 25'. The water turbine 23 may be any known type and comprises a turbine casing 26, blades 27 connected to a shaft of a generator 29 housed in the casing 26, and guide vanes 28 for controlling flow rate through the turbine, that is, the output of the turbine 23. The generator 29 is fixed to the penstock 24 by means of stay-vanes 29'. Power obtained by the generator is sent to a suitable apparatus 31 in the power plant through suitable lines (not shown in the drawing). A discharge gate 33 is provided in a discharge 32 downstream of the turbine 23 to open or close the discharge 32. This discharge gate is adapted to close the discharge when the water is drained from the turbine casing to disassemble and check the generator.

According to the invention, the penstock 24 starts from the reservoir 22, extends upwardly and forwardly toward the dam 21, then passes over the top of the dam, then extends downwardly and forwardly toward the turbine, and terminates at said turbine 23. The uppermost portion 24a of the penstock which is located on the top of the dam 21 is provided with a vacuum pump 34 and a vacuum breaker 35. In order to supply water from the reservoir 22 to the water turbine 23 through the penstock 24, the vacuum pump 34 is driven to reduce the pressure in the penstock 24, thereby filling the interior of the penstock with water by a siphon effect. If it is necessary to rapidly shut off the water flow to the turbine 23, as for example when the guide vanes of the turbine become uncontrollable due to an unexpected accident, the vacuum breaker 35 can be actuated to introduce air into the penstock to end the siphon effect, thereby stopping the supply of water to the turbine in a short time (for example, on the order of 10 seconds).

Figure 3:
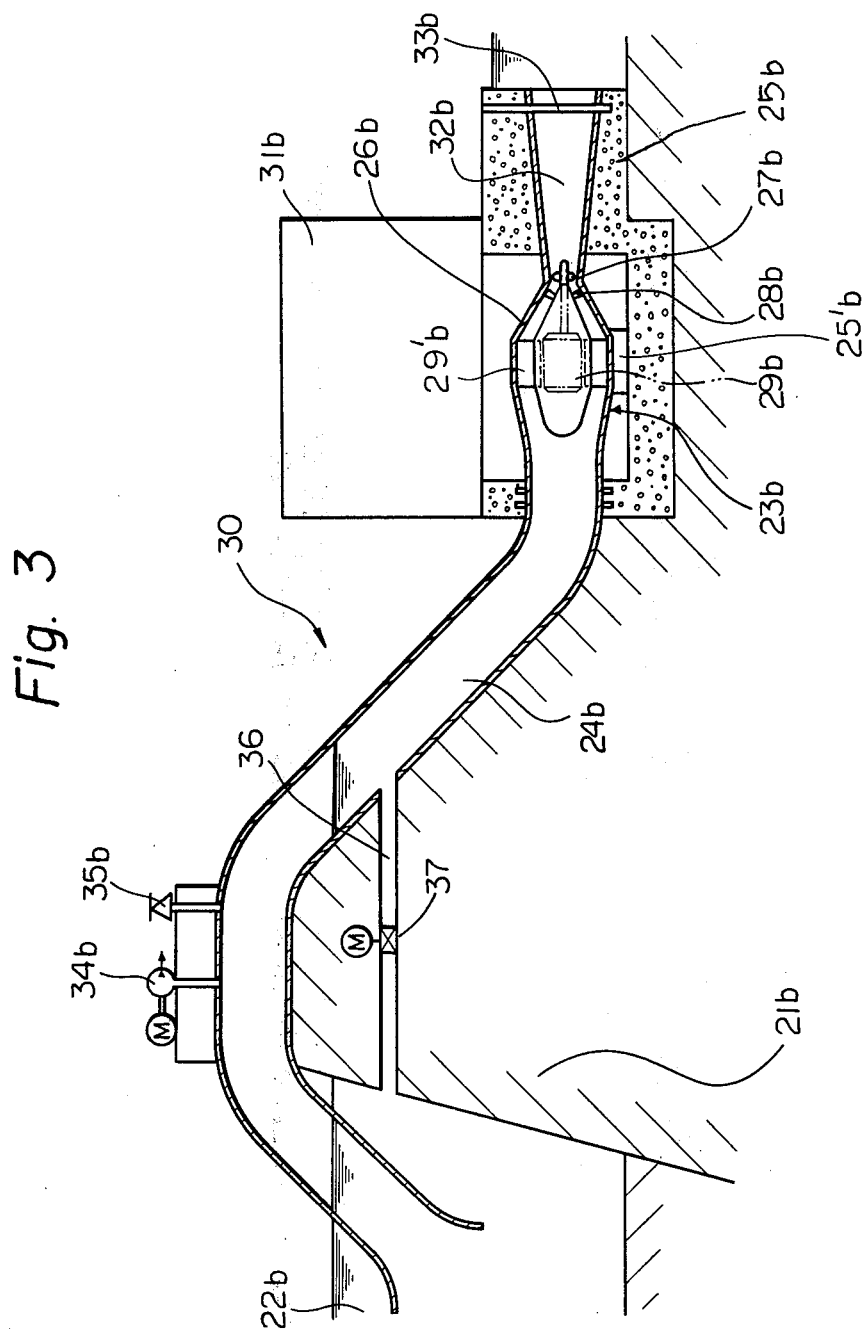
FIG. 3 is a longitudinal sectional view of a hydraulic power plant according to another embodiment of the present invention showing it in its inoperative condition.

FIG. 3 shows a hydraulic power plant 30 according to another embodiment of the invention. The power plant 30 in this embodiment has substantially the same construction as that shown in FIG. 2. Accordingly, the same constructional elements (such as the penstock, the turbine and the like) are indicated by the same reference numerals as those in FIG. 2, but with the symbol "b" added thereafter. Further, for brevity, the detailed description of these elements is omitted. In this hydraulic power plant 30, there is a bypass passage 36 which passes through the dam wall 21b and connects the reservoir 22b to the penstock 24b. Further, a bypass valve 37 is also provided in the bypass passage 36 for controlling the opening and closing of the bypass passage. It should be noted that in this power plant 30 time required to fill the interior of the penstock with water can be shortened. More particularly, in operation, the bypass valve 37 is at first actuated to open the bypass passage 36, thereby introducing water from the reservoir to the penstock until the water level in the penstock reaches the water level in the reservoir. Then, the vacuum pump 34b is actuated to completely fill the penstock with water. During the operation of the turbine the bypass passage may be closed. It should be noted that the provision of the bypass passage does not require the destruction of the dam wall, since the bypass passage 36 can be easily installed by a boring operation.

Although, as described above, the present invention is embodied as a low head hydraulic power plant having a tubular turbine, the present invention can be applied to a higher head hydraulic power generation system and is capable of using turbines other than a tubular turbine, such as a Kaplan turbine, a Francis turbine or the like.

An unexpected advantage derived from the aforementioned arrangement is obtained by the use of the hydraulic power plant of the present invention, since the penstock may be provided across the dam but need not pass through the dam wall so that the power plant is readily installed so as to make best use of the existing dam without destruction thereof.

Another advantage obtained by the use of the vacuum pump and the vacuum breaker is to avoid the necessity of providing a large-scale, expensive intake gate and an associated hoist. Further, a bypass passage may be formed so that the penstock is readily and promptly filled with water.

While the invention has been described with reference to preferred embodiments, it will be understood by those skilled in the art that various changes may be made and equivalents may be substituted for elements thereof without departing from the scope of the invention. Therefore, it is intended that this invention not be limited to the particular embodiments disclosed as the best mode contemplated for carrying out this invention, but that the invention will include all embodiments falling within the scope of the appended claims.

What is claimed is:

1. A hydraulic power plant comprising a reservoir having a dam wall, a water turbine and generator means connected thereto, said turbine being on the opposite side of the dam wall from the reservoir and below the level of the surface of the reservoir, and a penstock for supplying water from the reservoir to the water turbine, said penstock extending from the reservoir over the dam wall to the water turbine without passing through said dam wall, and vacuum pump means connected to said penstock at substantially the uppermost portion of the penstock for filling the penstock with water.

2. A hydraulic power plant according to claim 1, further comprising vacuum breaker means connected to the uppermost portion of said penstock for shutting off water flow into the water turbine.

3. A hydraulic power plant according to claim 1, further comprising a bypass passage passing through the dam wall and connecting the reservoir to a portion of the penstock downstream of the uppermost portion of said penstock and upstream of said turbine.

4. A hydraulic power plant according to claim 1, further comprising a bypass passage passing through the dam wall connecting the reservoir to a portion of the penstock downstream of the uppermost portion of said penstock and upstream of said turbine, and shutter means in the outlet of the penstock downstream of said turbine for opening and closing the outlet of said penstock.

* * * * *